(12) United States Patent
Lewis

(10) Patent No.: US 9,983,650 B2
(45) Date of Patent: May 29, 2018

(54) MULTI-COLORED DISPLAY ILLUMINATION CONTROL FOR INDICATING DEVICE STATUS AND/OR ACTIVITY

(71) Applicant: RAKUTEN KOBO INC., Toronto (CA)

(72) Inventor: Damian Lewis, Toronto (CA)

(73) Assignee: RAKUTEN KOBO INC., Toronto (CA)

(*) Notice: Subject to any disclaimer, the term of this patent is extended or adjusted under 35 U.S.C. 154(b) by 81 days.

(21) Appl. No.: 14/231,396

(22) Filed: Mar. 31, 2014

(65) Prior Publication Data
US 2015/0277495 A1    Oct. 1, 2015

(51) Int. Cl.
G06F 1/16 (2006.01)
G06F 1/32 (2006.01)
G02F 1/1335 (2006.01)

(52) U.S. Cl.
CPC .............. G06F 1/32 (2013.01); G06F 1/1637 (2013.01); *G02F 2001/133616* (2013.01)

(58) Field of Classification Search
CPC ........................... G06F 1/1633; H04W 52/027
See application file for complete search history.

(56) References Cited

U.S. PATENT DOCUMENTS

| | | | | |
|---|---|---|---|---|
| 5,386,577 A * | 1/1995 | Zenda | ................... | G06F 1/3218 315/169.3 |
| 6,385,466 B1 * | 5/2002 | Hirai | ...................... | G01C 21/26 340/990 |
| 2003/0072440 A1 * | 4/2003 | Murray | .................... | H04M 1/22 379/419 |
| 2003/0230991 A1 * | 12/2003 | Muthu | ................. | G09G 3/3413 315/307 |
| 2004/0171410 A1 * | 9/2004 | Deeds | ..................... | H04M 1/22 455/575.1 |
| 2004/0222977 A1 * | 11/2004 | Bear | ...................... | G06F 11/328 345/184 |
| 2006/0017581 A1 * | 1/2006 | Schwendinger | .... | G01R 31/3689 340/636.1 |
| 2007/0206751 A1 * | 9/2007 | Hsu | ....................... | H04M 1/573 379/142.02 |
| 2008/0204268 A1 * | 8/2008 | Dowling | ................ | H05B 37/02 340/815.45 |
| 2009/0015580 A1 * | 1/2009 | Hoffman | ............... | G06F 1/3203 345/212 |
| 2009/0327777 A1 * | 12/2009 | Vasquez | ............... | G09G 3/3611 713/320 |
| 2010/0123597 A1 * | 5/2010 | Kitsukawa | ............ | G06F 1/1626 345/173 |
| 2010/0317408 A1 * | 12/2010 | Ferren | ................... | G06F 1/3265 455/566 |
| 2011/0237181 A1 * | 9/2011 | Nelson | .................... | H04M 1/22 455/3.06 |
| 2013/0067255 A1 * | 3/2013 | Nikam | .................. | G06F 1/3212 713/320 |

(Continued)

*Primary Examiner* — Benjamin C Lee
*Assistant Examiner* — Dong Hui Liang
(74) *Attorney, Agent, or Firm* — Oblon, McClelland, Maier & Neustadt, L.L.P.

(57) ABSTRACT

A computing device that includes a programmatically controlled front light. The front light cast light onto a display surface and/or other region of the computing device, for purpose of providing illumination and/or lighting effect.

16 Claims, 6 Drawing Sheets

(56) References Cited

U.S. PATENT DOCUMENTS

| | | | |
|---|---|---|---|
| 2013/0116015 A1* | 5/2013 | Lee | H04R 1/1025 |
| | | | 455/569.1 |
| 2013/0321156 A1* | 12/2013 | Liu | H04M 1/6008 |
| | | | 340/573.1 |
| 2014/0198084 A1* | 7/2014 | Peana | G09G 3/3406 |
| | | | 345/207 |
| 2015/0080058 A1* | 3/2015 | Rhee | G06F 3/04817 |
| | | | 455/566 |

* cited by examiner

MULTI-COLORED DISPLAY ILLUMINATION CONTROL FOR INDICATING DEVICE STATUS AND/OR ACTIVITY

TECHNICAL FIELD

Examples described herein relate a system and method for controlling illumination provided onto a display surface in order to reflect a state of a component of a computing device.

BACKGROUND

An electronic personal display is a mobile electronic device that displays information to a user. While an electronic personal display may be capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such as (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

An electronic reader, also known as an e-reader, is an electronic personal display that is used for reading electronic books (eBooks), electronic magazines, and other digital content. For example, digital content of an eBook is displayed as alphanumeric characters and/or graphic images on a display of an e-reader such that a user may read the digital content much in the same way as reading the analog content of a printed page in a paper-based book. An e-reader provides a convenient format to store, transport, and view a large collection of digital content that would otherwise potentially take up a large volume of space in traditional paper format.

In some instances, e-readers are purpose built devices designed especially to perform especially well at displaying readable content. For example, a purpose built e-reader may include a display that reduces glare, performs well in high light conditions, and/or mimics the look of text on actual paper. While such purpose built e-readers may excel at displaying content for a user to read, they may also perform other functions, such as displaying images, emitting audio, recording audio, and web surfing, among others.

There also exists numerous kinds of consumer devices that can receive services and resources from a network service. Such devices can operate applications or provide other functionality that links the device to a particular account of a specific service. For example, e-reader devices typically link to an online bookstore, and media playback devices often include applications which enable the user to access an online media library. In this context, the user accounts can enable the user to receive the full benefit and functionality of the device.

DETAILED DESCRIPTION

Figure 1:
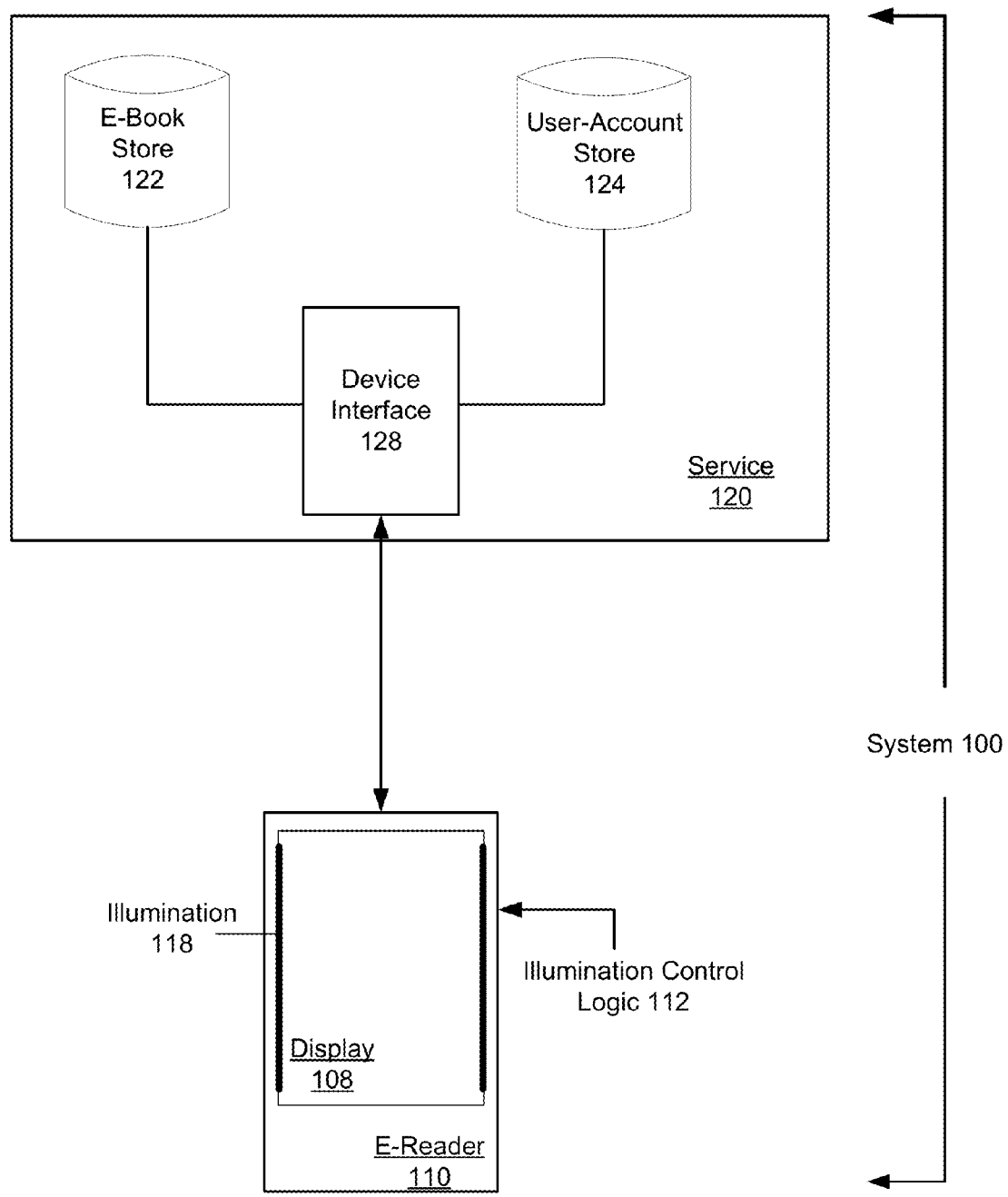
FIG. 1 illustrates a system for operating a computing device to enhance electronic reading activity, according to an embodiment.

Examples described herein include a computing device that is able to control the illumination of a display surface of the computing device, separate and independent of content outputted by the display device. In particular, some examples provide for a computing device that includes a programmatically controlled front light. The front light cast light onto a display surface and/or other region of the computing device, for purpose of providing illumination and/or lighting effect. Examples described herein provide for a computing device that can programmatically control changes in the state of a front light component, including control of changes to color, luminosity, and/or lighting effect.

Still further, in some embodiments, a computing device is operable to detect one or more pre-determined illumination triggers for a front light of the computing device. A state for the front light is selected based on the detected one or more pre-determined illumination triggers, and the front light is controlled to change into the selected state.

In an embodiment, a computing device includes a housing, a display screen, a front light that is optically coupled to the display screen, a memory that stores a set of instructions, and one or more processors that use instructions stored in the memory to detect one or more device conditions that affect an ability of the computing device to render content. The one or more processors further control the front light based on the detected one or more device conditions.

In one or more other embodiments, a computing device is operated to detect one or more device conditions that affect an ability of the computing device to render content on a display screen. While content is displayed on the display screen of the computing device, the computing device the front light based on a detected one or more device conditions.

Still further, in another embodiment, a computing device is operated to detect an application notification, and controls the front light based on the detected notification.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System and Device Description

FIG. 1 illustrates a system for operating a computing device to enhance electronic reading activity, according to an embodiment. In an example of FIG. 1, system 100 includes an electronic display device, shown by way of example as an e-reader device 110, and a network service 120. The network service 120 may include multiple servers and other computing resources that provide various services in connection with one or more applications that are installed on the e-reader device 110. By way of example, in one implementation, the network service 120 can provide e-book services which communicate with the e-reader device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reader device 110 can correspond to any electronic personal display device on which applications and application resources (e.g., e-books, media files, documents) can be rendered and consumed. For example, the e-reader device 110 can correspond to a tablet or a telephony/messaging device (e.g., smart phone). In one implementation, for example, e-reader device 110 can run an e-reader application that links the device to the network service 120 and enables e-books provided through the service to be viewed and consumed. In another implementation, the e-reader device 110 can run a media playback or streaming application which receives files or streaming data from the network service 120. By way of example, the e-reader device 110 can be equipped with hardware and software to optimize certain application activities, such as rendering of electronic content (e.g., e-books). For example, the e-reader device 110 can have a tablet like form factor, although variations are possible. In some cases, the e-reader device 110 can also have an E-ink display.

In additional detail, the network service 120 can include a device interface 128, a resource store 122 and a user account store 124. The user account store 124 can associate the e-reader device 110 with a user and with an account 125. The account 125 can also be associated with one or more application resources (e.g., e-books), which can be stored in the resource store 122. As described further, the user account store 124 can retain metadata for individual accounts 125 to identify resources that have been purchased or made available for consumption for a given account. The e-reader device 110 may be associated with the user account 125, and multiple devices may be associated with the same account. As described in greater detail below, the e-reader device 110 can store resources (e.g., e-books) that are purchased or otherwise made available to the user of the e-reader device 110, as well as to archive e-books and other digital content items that have been purchased for the user account 125, but are not stored on the particular computing device.

With reference to FIG. 1, the e-reader device 110 includes a housing 106 that includes a display surface 108 on which text content from selected e-books can be rendered. The e-reader device 110 also includes a separate or independent illumination component 118 for the display surface 108. In some examples provided herein, the illumination component 118 is provided as a front light, which directs light onto the display surface 108 from a housing bezel or thickness.

Figure 2A:
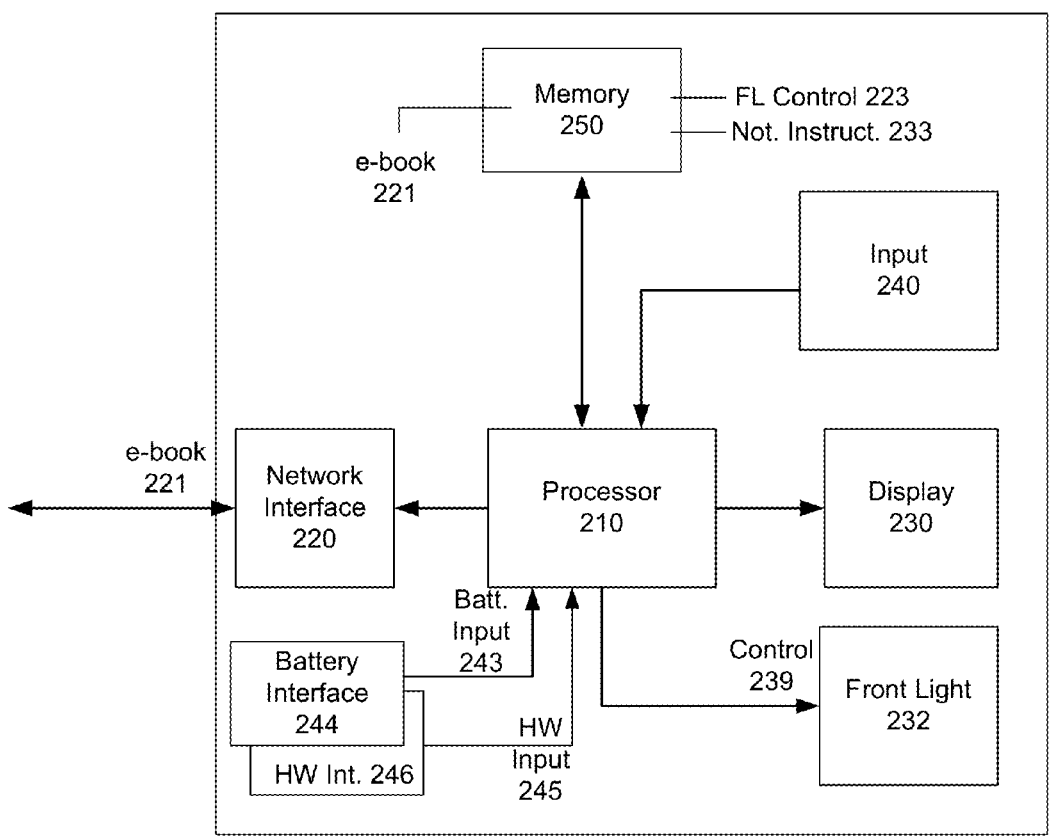
FIG. 2A illustrates an example of an e-reader device or other electronic personal display device, for use with one or more embodiments described herein.

As described in example of FIG. 2A, the display surface 108 can be configured as a touch sensitive component of a display assembly on which input features are provided or are otherwise enabled. By way of example, the input features can include soft buttons or hidden touch regions where the user can transition pages from an e-book, looking words up (using a dictionary function).

According to some examples, the illumination component 118 independently illuminates the display surface 108 in order to create a visual effect. The visual effect can correspond to, for example, illuminating an otherwise non-illuminated screen (such as provided by electronic paper type displays). The illumination can further be provided with characteristics, such as luminosity, color, and and/or other lighting effects.

The e-reader device 110 can include illumination control logic 112 that controls one or more illumination aspects of the illumination component 118. As described with examples, the illumination control logic 112 can control one or more of the color, the luminosity, lighting affect (e.g., blinking or modulation), or other illumination characteristic. Furthermore, in some variations, the illumination control logic 112 controls the illumination component 118 in a manner that is responsive to triggers. As described with various examples, the illumination component 118 can be responsive to triggers that correlate to an output or operational status of a hardware component. Additionally, the illumination component 118 can be responsive to settings and/or input provided by a user through interaction with the e-reader device 110. As described with examples, the illumination control logic 112 controls the lighting aspects of the illumination component 118 while the display surface 108 is used to render content, such as pages of an e-book. In this way, the illumination component 118 can generate, for example, status information independently of content displayed on the display surface 108.

In one implementation, the illumination component 118 is provided in the form of light emitting diodes (LEDs) or other discrete light sources that are disposed in a housing 106 of the e-reader device 110. The illumination component 118 can be programmatically controllable to modulate in color, luminosity and/or affect. The orientation of the illumination component 118 directs light onto the display surface 108 independent of content rendered through the display surface. As shown with examples of FIG. 2B and FIG. 2C, the light sources that comprise the illumination component 118 can be disposed in a bezel of the housing 106 so as to cast light on to the display surface 108.

Hardware Description

FIG. 2A illustrates an example of an e-reader device or other electronic personal display device, for use with one or more embodiments described herein. In an example of FIG. 2A, an e-reader device 200 can correspond to, for example, a device, such as also shown by an example of FIG. 1. With reference to FIG. 2A, e-reader device 200 includes a processor 210, a network interface 220, a display 230, a front light 232, one or more input mechanisms 238, a battery interface 244, one or more hardware interfaces 246, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reader device 200 can access the network service 120 to receive various kinds of resources (e.g., digital content items such as e-books, configuration files, account information), as well as to provide information (e.g., user account information, service requests etc.). For example, e-reader device 200 can receive application resources, such as e-books 221 or media files that the user elects to purchase or otherwise download from the network service 120. The application resources that are downloaded onto the e-reader device 200 can be stored in the memory 250.

In some implementations, the display 230 can correspond to, for example, a liquid crystal display (LCD) or light emitting diode (LED) display that illuminates in order to provide content generated from processor 210. In some implementations, the display 230 can be touch-sensitive. In some variations, the display 230 can correspond to an electronic paper type display, which mimic conventional paper in the manner in which content is displayed. Examples of such display technologies include electrophoretic displays, electrowetting displays, and electrofluidic displays.

The front light 232 provides an example of illumination component 118 (see FIG. 1). In the example provided, the front light 232 is optically coupled to the display surface of the display 230 in order to independently illuminate the displays screen of the display 230. The front light 232 can be implemented using a variety of different light sources, including a set of one or more miniaturized or discrete light sources such as light emitting diodes (LEDs). In one implementation, the front light 232 can be composed of a set of one or more multicolored LEDs, such as red-green-blue-white (RGBW) LEDs.

The processor 210 can receive input from various sources, including from input mechanisms 240 (e.g., buttons or switches, microphone, keyboard), and/or the display 230 (e.g., soft buttons or keyboard) or other input mechanisms (accessory devices). The processor 210 can further communicate with the display 230 in order to render content onto a display surface of the display 230. The processor 210 can also send control signals 239 to the front light 232, for purpose of controlling the state of the front light 232 in casting light onto the display surface of the display 230.

The memory 250 can store instructions 223 for implementing the illumination control logic 112 (see FIG. 1) ("front light control instructions 223"). The memory 250 can also store e-books 221, including e-books that can be, for example, downloaded from the network service 120 (see FIG. 1). The processor 210 can execute front light control instructions 223 in order to control the front light 232. In one implementation, the front light control instructions 223 provide for the processor 210 to be responsive to conditions or events in controlling operation and/or lighting characteristics of the front light 232. In particular, the front light control instructions 223 can provide for the processor 210 to be responsive to conditions or events of the device that are pertinent to the ability of the device to render content. In this way, some examples provide for the processor 210 to utilize the change in state to the front lights as a mechanism for communicating information to the user (e.g., battery state or device state).

By way of example, the processor 210 can utilize front light control instructions 223 to change the color or luminosity of the front light in a manner that reflects one or more of an operational state of a component of the device, and/or a power level of a battery of the device. Accordingly, in one implementation, the processor 210 receives battery input 243 from a battery interface 244 for the e-reader device 200. The processor 210 can identify one or more triggers from a value of the battery input 243, and then output control signals 239 to the front light 232 based on the battery input 243. The control signals 239 can specify, for example, a color for the front light 232 based on the power level of the battery (e.g., orange color for low battery, red for very low).

In another implementation, the processor 210 receives hardware input 245 reflecting, for example, an operational state of a particular hardware component. For example, the hardware interface 246 can detect the power level or connectivity status of one or more wireless radios, and the hardware input 245 can reflect the power levels and/or connectivity status of the wireless radios. The processor 210 can respond by outputting control signal 239 to change the state of the front light 232 to reflect the power levels and/or connectivity status of the wireless radios. Thus, for example, the front light 232 can illuminate in a particular manner to reflect that the e-reader device 200 is in airplane mode.

In variations, the processor 210 can execute instruction sets 233 for implementing one or more notification centers. The instructions 233 can, for example, interface with applications and/or device (or device interfaces) in order to detect application or device generated notifications. Application generated notifications can include, for example, incoming messages (e.g., email messages, text messages, etc.), application notifications (e.g., application update available), network service updates (e.g., new e-books available for purchase, etc.), alarm clock notifications and/or programmatic timers (or clocks). Device generated notifications can inform the user of device status (e.g., power level, battery level etc.). The notification instructions sets 233 can execute to enable the processor 210 to detect the occurrence of notifications. The processor 210 can execute the front light control instructions 223 responsively to notifications, so that control signal 239 causes the front light 232 to change state and reflect the notification. The front light 232 state change can reflect, for example, the type and/or source of the notification, using characteristics such as color. For example, the front light color can be selected based at least in part on the application source of the trigger.

Front Light

Figure 2B:
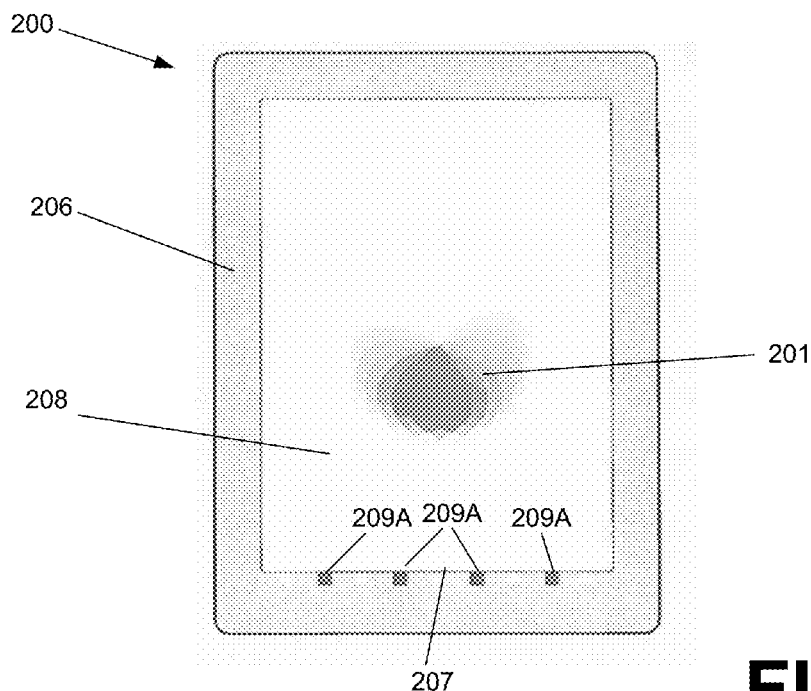
FIG. 2B and FIG. 2C illustrate alternative examples of e-reader device having a front light in accordance with one or more embodiments.
Figure 2C:
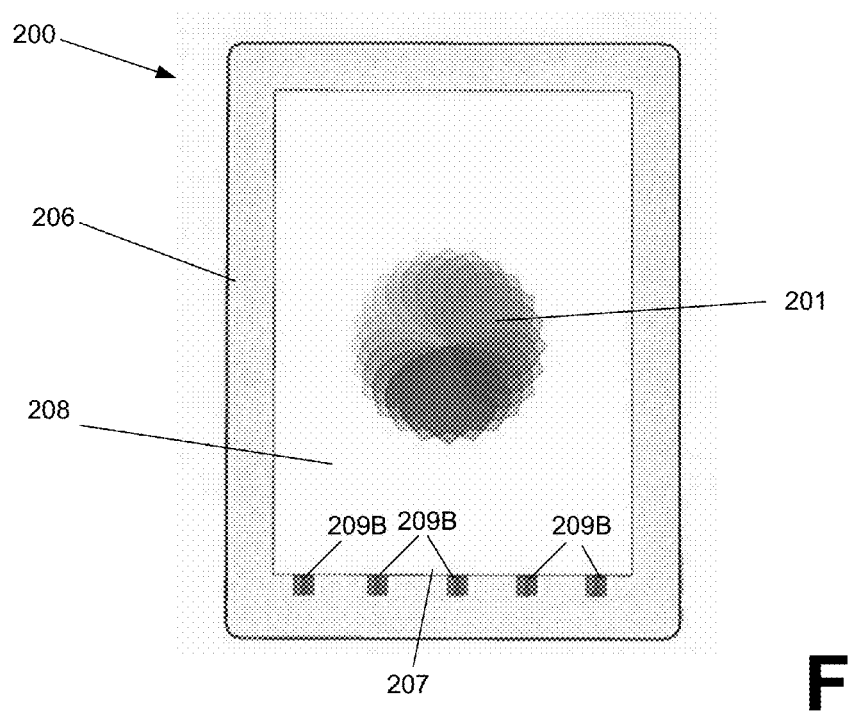

FIG. 2B and FIG. 2C illustrate alternative examples of e-reader device 200 having a front light in accordance with one or more embodiments. In more detail, the e-reader device 200 of FIG. 2B and FIG. 2C can include housing 206 for supporting the display surface 208. The display surface 208 can form the exterior surface of the display 230 (see FIG. 2A). For example, in the context of e-paper type displays, the display surface 208 can provide a visual interface for the reader, and content provided through the display surface 208 can be non-illuminated.

The housing 206 provides a bezel 207 which surrounds the display surface 208 and provides a thickness relative to the display surface 208. The bezel 207 can provide structure for supporting discrete light sources. For example, a set of LEDs 209A (FIG. 2B), 209B (FIG. 2C) can be at least partially disposed within the bezel 207 to direct light 201 onto the display surface 208.

In examples of FIG. 2B and FIG. 2C, the LEDs 209A, 209B can be operable in multiple states (e.g., on/off, blinking, patterned blinking), and/or multiple luminosity states (e.g., dim/bright). Additionally, in an example of FIG. 2C, the LEDs 209B are multicolored, so as to be illuminatable in multiple colors. For example, the LEDs 209B can correspond to RGBW LEDs that generate illumination for the display surface 208 in one of multiple colors. The state and/or color of the LEDs 209A (FIG. 2B), 209B (FIG. 2C) can be determined by control of the processor 210 (see FIG. 2A). In particular, as described with some examples, the processor 210 can identify events and/or conditions would trigger changes in the state of the LEDs 209A, 209B.

Device System

Figure 3:
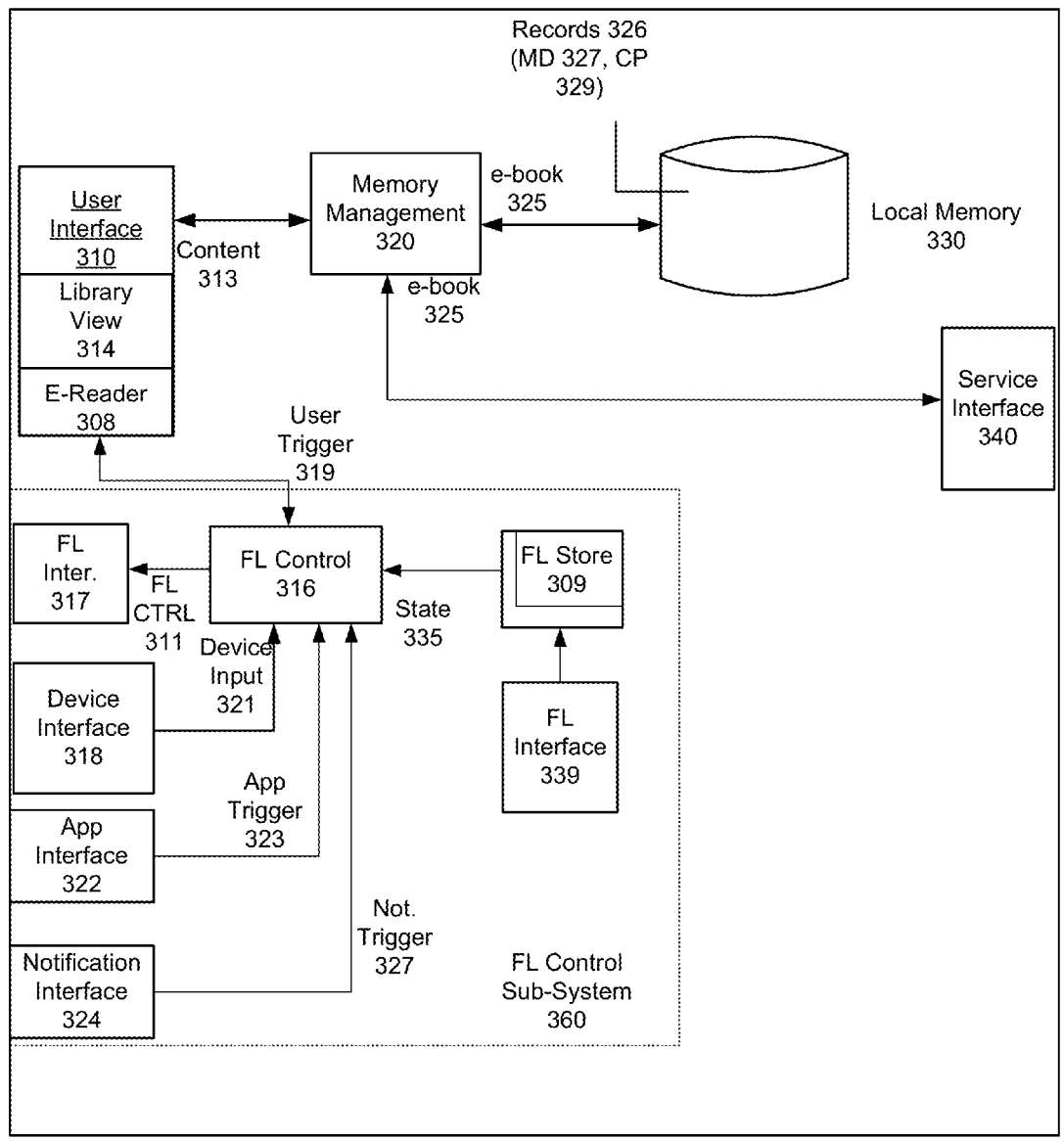
FIG. 3 illustrates an example device system for providing illumination onto a display surface of an e-book device, according to one or more embodiments.

FIG. 3 illustrates an example device system for providing illumination onto a display surface of an e-book device, according to one or more embodiments. In reference to FIG. 3, a device system 300 implements programmatic components for communicating with an e-book service (such as network service 120, shown in FIG. 1), as well as for enabling functionality for viewing and accessing e-books utilized by an account associated with the e-reader device 110 (see FIG. 1 or FIG. 2). In some embodiments, the device system 300 can be implemented as an application that runs on an e-reader device, such as shown with examples of FIG. 1 or FIG. 2A through FIG. 2C.

In an example of FIG. 3, system 300 includes a user interface 310, a memory management module 320, a local memory 330, a service interface 340, and a front light control subsystem 360. Some or all of the programmatic components shown with the device system 300 can be provided in part as operating system-level components. Alternatively, the programmatic components shown with the device system 300 can be provided as part of an application that runs on, for example, the e-reader device 110. For example, the user can download an application onto the device that is operated as the e-reader device 110, in order to obtain functionality such as described with an example of FIG. 3. Alternatively, an application can be embedded or otherwise preinstalled with other programmatic elements for providing functionality such as described with system 300.

The service interface 340 includes application logic which enables the e-reader device 110 to use, for example, a wireless Internet connection, to connect to the network service 120 (see FIG. 1). In connecting with the service, the service interface 340 can transmit data that enables the network service 120 to identify the e-reader device 110 on which system 300 is implemented, so that the network service 120 can determine the account that is associated with the particular e-reader device. The service interface 340 can be used to retrieve e-books 325 from the network service 120. For example, in identifying the e-reader device 110 of system 300 to the network service 120, the network service may be able to procure payment information (e.g., stored credit card information) that can be used to charge the users account when the user purchases a new e-book from the service. Each e-book can correspond to a literary work having a pagination format. Optionally, some e-books may have chapter designations, as well as content that corresponds to graphics or images (e.g., such as in the case of magazines or comic books). Individual e-books 325 can also include metadata 327, such as imagery provided as a cover for the e-book when the e-book is marketed (e.g. similar to the manner in which a conventional hardbound book would be marketed in a retail store). In one implementation, the network service 120 can retrieve or otherwise identify the imagery and other metadata 327 of individual e-books from publisher sources.

In identifying the e-reader device of system 300, the network service 120 can identify what e-books belong to the account associated with the particular device. The e-books that are transmitted to the e-reader device of system 300 include those e-books that are purchased from the device, or those e-books that the user requested to download. In variations, e-books can be automatically downloaded to the device in response to occurrence of certain conditions. For example, the user can purchase an e-book on another device, and then subsequently connect to the network service 120 via the e-reader device 110 to automatically receive their previously purchased e-book. Alternatively, as another example, network service 120 can be configured to push e-books to the e-reader device 110 of system 300, based on, for example, user account settings, subscription plans and rules, and various other business logic considerations.

Additionally, the service interface 340 can include processes for automatically receiving updates from a network service 120. The update can include programmatic updates, including updates to software components on the e-reader device 110, as well as updates to lists, download of e-books that the user may have purchased on another device of the same account, recommendations from the network as to what a given user may want to purchase or view, and/or various other data that can be either generally provided to the user of the network service or specifically provided for to the particular account or user.

According to some embodiments, the local memory 330 stores each e-book as a record 326 that includes metadata 327 and content portion 329 (e.g., page content). The management module 320 can retrieve portions of individual e-books for purpose of rendering e-books via the user interface 310.

In an example of FIG. 3, the user interface 310 of device system 300 includes an e-reader component 308 and a library view component 314. The e-reader component 308 displays content from a given e-book of the user selection via the memory management 320 and/or local memory 330. For example, the e-reader component 308 can display content 313 (e.g., one or more pages of) content portion 329 of a given e-book 325. The e-reader component 308 can include features to enable the user to perform actions such as the page turning, chapter turning, page turning by clusters, scanning, and/or searching. As additional examples, the e-reader component 308 can provide features for enabling the user to adjust settings (e.g., brighten or dim display), annotate or highlight, perform a dictionary lookup or translation, and/or share or perform social networking activities. In response to input provided by the user, the e-reader component 308 can update the content 313 that is displayed. For example, in response to a page or chapter turn input, the e-reader component 308 can retrieve and update content 313 (via the memory management 320) from the memory 330, and further output the updated content for display on the device for system 300.

The library view 314 can display objects representing e-books and other content items for the user. In one implementation, the library view 314 displays metadata content, corresponding to images and/or text associated with the metadata 327 of the e-book 325 that is being displayed. For example, the library view 314 can display book cover images and author information for the e-books that are in the user library. The library view 314 can also display metadata for e-books that are provided from network service 120 (see FIG. 1) and/or which are in the user library, but not stored locally (e.g., archived e-books).

In one implementation, user interface 310 can be coupled to the front light control subsystem 360. The front light control subsystem 360 can include a front light control component 316, and one or more of a device interface 318, application interface 322 and/or notification interface 324. In more detail, the front light control component 316 includes instructions and other logic for controlling the front light of the device on which system 300 is implemented. In the example provided, the front light control component 316 is coupled to an interface 317 for front lights. By way of example, the interface 317 can be used to signal front lights (LEDs 209A or 209B, as shown with examples of FIG. 2B and FIG. 2C). The interface 317 can be used to signal changes to the state of front lights of the device for system 300. In one implementation, the front light component 316 signals control 311 to the front light interface 317. The front light control 311 can cause the interface 317 to change an existing state (e.g., illumination level, color etc.) of the front light, and further to specify one or more future states of the front lights.

In some variations, front light control component 316 can include user-interface features that are displayed via the user interface 310. For example, the front light control component 316 can include features that are displayed via the e-reader component 308 and/or library view 314. One or more such features can enable the user to provide input that signals a user-trigger 319 to the front light control component 316. The user-trigger 319 can be signaled to the front light control component 316 to change the state of the front lights while, for example, the user is viewing content 313 that is provided through the e-reader component 308. The user-trigger 319 can specify a state for the front light. More specifically, input corresponding to user-trigger 319 can specify the state for the front light. For example, the user-trigger 319 can specify that illumination level, color and/or lighting pattern of the front light. By way of example, the user can view a page of an e-book 325 via the e-reader component 308, then select a front light feature that enables the user to specify a color (e.g., blue) and/or brightness for the front light.

As an alternative or variation, the front light component 316 can also be responsive to device input 321 from the device interface 318. The device interface 318 can include programmatic components that interface with, for example, a battery, wireless radio or speaker of the device of system 300. The device interface 318 can, for example, signal device input 321 in the form of a battery level or state (for battery), an operational state of a wireless radio, and/or an operational state of a speaker or microphone. The front light control component 316 can correlate the device input with a trigger in order to identify whether a change in the state of the front lights is to occur. In one implementation, the front light control component 316 correlates the device input 321 with the front light store 309 in order to determine (i) whether the change in state to the front lights is to occur based on the input 321, and/or (ii) what the new state of the front light is to be based on the input 321. The input 321 can include values or state information that correlate to, for example, a specific color, luminosity range or light affect.

In some variations, the application interface 322 can signal application triggers 323 to the front light control component 316. The application triggers 323 can be defined by applications that run on the device of system 300. By way of example, the application triggers can be generated by a (i) messaging application (e.g., email or Short Service Message (SMS)) in connection with an incoming message, or (ii) a time clock application to signal an alarm or event timer. The front light control component 316 can correlate the application triggers 323 to triggers using, for example, the front light store 309. For example, messaging applications can have pre-defined correlations to specific front light colors. In this way, the application trigger 323 can cause the front light control component 316 to signal the control 311 for the front light interface 317, to alter or change the state of the front lights in a pre-determined manner.

In still another variation, the front light control subsystem 360 can include functionality that interfaces with the notification center of a device. For example, the device of system 300 can include a notification center that aggregates notifications from multiple sources, such as from messaging applications, downloaded or purchased applications and/or device interfaces. The notification interface 324 can signal notification triggers 327 to the front light control component 316. The front light control component 316 can correlate the notification trigger 327 to the state of the front lights using, for example, the front light store 309. The notification trigger 327 can cause the front light control component 316 to make a determination as to whether the state of the front light is to be changed, and further the manner in which the front light is to be changed (e.g., colored, blinking, etc.).

In some variations, the user can specify input or settings that determine the response of the front light control component 316 to inputs and triggers from different sources. For example, in one implementation, a front light interface 339 enables the user to specify correlations between the state 335 of the front lights and one or more of the device inputs 321 (e.g., battery level), application notifications (e.g., incoming messages) and notification triggers 327 (e.g., application update available). By way of example, the user can specify that the front lights are to change to a specific color, or alternatively change to a different color, each time a new message is received.

Methodology

Figure 4:
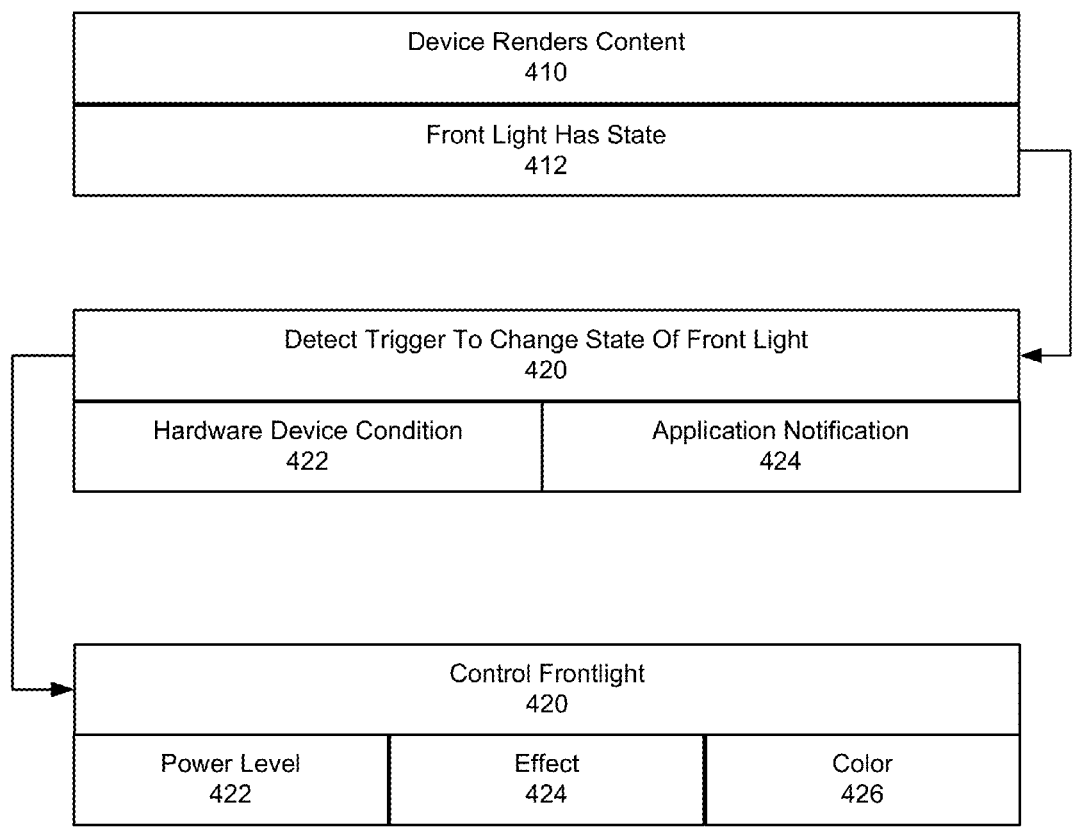
FIG. 4 illustrates an example method for controlling a state of an illumination component that is provided to cast light onto a display surface of an e-reader device, according to an embodiment.

FIG. 4 illustrates an example method for controlling a state of an illumination component that is provided to cast light onto a display surface of an e-reader device, according to an embodiment. An example method such as provided by FIG. 4 can be implemented using components such as described with examples of FIG. 1, FIG. 2A, FIG. 2B, FIG. 2C, or FIG. 3. Accordingly, reference may be made to elements of other figures for purpose of illustrating a suitable component for performing a step or sub step being described.

With reference to FIG. 4, e-reader device 110 can render content for the reading activity (410). For example, the e-reader device 110 can render content corresponding to a page (or to a set of pages) of an e-book that is in use. As another example, the rendered content can include metadata content, representing for example, graphical images of e-books or other content items (e.g., music albums) that are associated with a particular device. In variations, other kinds of content can be displayed or used on the e-reader device 110. For example, the device can be used with other applications that render content such as text.

The device can render the content with the front lights having a particular state (412). For example, the front lights can have a state of being off, illuminated without color, or illuminated with a particular color.

While the content is rendered, a condition or trigger for changing a state of the front light is detected (420). In one implementation, the trigger can correspond to a hardware device condition (422). By way of example, the hardware device condition can correspond to a low (and/or ultralow) power state of the device battery. As another example, the hardware device condition can correspond to a power or operational state of another component (e.g., wireless radio, speaker, etc.).

In a variation the trigger can be generated by an application (e.g., messaging application) (424). For example, the notification can be provided by a messaging application that generates notifications based on, for example, incoming messages. Alternatively, the notification can be provided by a clock application, to indicate the occurrence of, for example, an alarm or other timed event. With reference to FIG. 3, the front light control component 316 can interface with an application in order to receive application notifications. Still further, the trigger can be initiated by an application that controls or otherwise regulates a hardware component, so that the application notification reflects the power or operational state of a corresponding hardware resource. By way of example, the application notification can be generated for a wireless radio application to reflect, for example, the power states of one or more wireless radios, or by a battery application to reflect a power level of the battery. In a variation, the front light control component 316 can interface with a notification center of a device in order to identify device and/or application notifications for the device.

The front light of the device can be controlled to change state based on the detected trigger (430). The detected trigger or condition can be correlated to the state of the front light based on a predetermined correlation between the detected trigger or condition and the state of the front lights. In this way, the front light can be controlled for color (432), effect (434) (such as blinking, fading, blinking in a pattern, etc.), and/or timing (436) (e.g., the duration in which the state being signaled is to last).

In some variations, the state of the state of the front light can be communicative of the triggering event. For example, if the detected trigger corresponds to a low battery event, the front light can be changed to reflect an orange color state. If the detected trigger corresponds to an ultra-low battery event, the front light can be changed to reflect a red color state. Thus, for example, the color state of the front light can be changed to reflect the importance of the notification. As another example, the color state of the front light can be changed to reflect an application source of the notification.

EXAMPLES

FIG. 5A through FIG. 5D illustrate examples of an e-book device that can vary a state of illumination for light that is cast on its display surface, according to one or more embodiments. In particular, FIG. 5A through FIG. 5D illustrate an e-book device 500, in accordance with examples such as provided by FIG. 1, FIG. 2A, FIG. 2B. FIG. 2C and FIG. 3, having a display surface 510 on which illumination from an independent source such as a front light is provided.

Figure 5A:
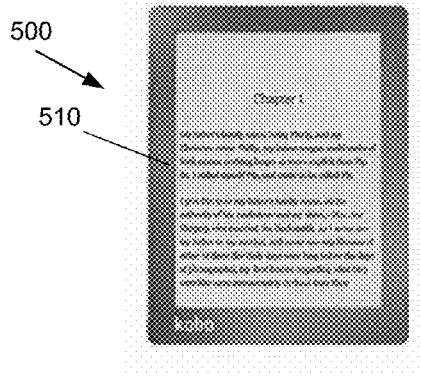
FIG. 5A through FIG. 5D illustrate examples of an e-book device that can vary a state of illumination for light that is cast on its display surface, according to one or more embodiments.
Figure 5B:
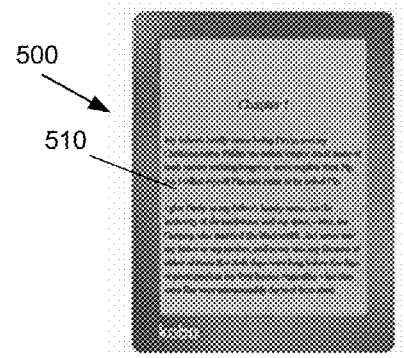
Figure 5C:
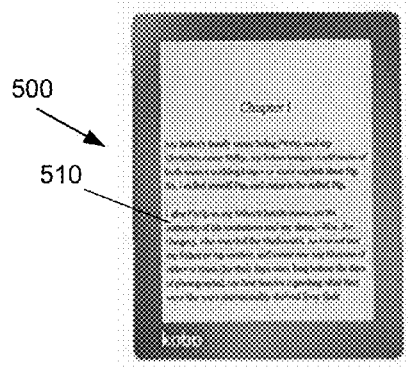
Figure 5D:
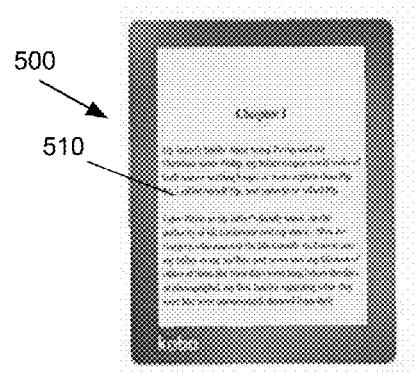

In examples of FIG. 5A through FIG. 5D, the state of illumination provided by, for example, the front light (not shown in FIG. 5A through FIG. 5D) is changed to reflect different colors. Thus, the color state of the illumination can vary, for example, between green (FIG. 5A), blue (FIG. 5B), pink (FIG. 5C) and yellow (FIG. 5D). In one example, the front light can be illuminated in response to a first event or condition (e.g., good battery level). As an alternative or variation, the front light can be illuminated and then changed in color or other appearance based on changes to the monitored device (e.g., battery). By way of illustration, the change in color to the front light can reflect depletion of the battery level and/or the occurrence of an application notification (e.g., alarm).

While some examples provide for the front light to after the color of the illumination, other implementations may change the warmth of the illumination. For example, cold illumination may refer to light that includes more white, creating a starker contrast. The illumination provided on the display 510 can vary between cold and warm depending on, for example, the power level of the battery. Numerous examples of described herein as to triggers can after the state of the front light, in addition to those provided with FIG. 5A through FIG. 5D.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
    a housing;
    a display screen;
    a front light optically coupled to the display screen;
    a memory that stores a set of instructions;
    one or more processors that use instructions stored in the memory to:
    detect a plurality of device conditions that affect an ability of the computing device to render content, wherein each of the plurality of device conditions is associated with a respective operational status of each one of a plurality of hardware components including a battery, a wireless radio, a speaker, and a microphone; and
    control the front light based on the detected device conditions by altering a state of the front light based on the operational status of each one of the hardware components,
    wherein altering the state of the front light includes (i) changing a color of the front light, (ii) changing a luminosity of the front light, and (iii) blinking the front light in a pattern, and
    wherein the state of the front light is altered differently for each of the device conditions.

2. The computing device of claim 1, further comprising:
    a battery to power components of the computing device; and
    wherein the one or more processors detect the one or more detected device conditions that include a power level of the battery.

3. The computing device of claim 2, wherein the one or more processors alter the color of the front light based on the power level of the battery.

4. The computing device of claim 1, wherein the housing forms a bezel over the display screen, and wherein the front light includes a multi-colored set of illumination elements that are disposed in the bezel to illuminate the display screen.

5. The computing device of claim 4, wherein the multi-colored set of illumination elements correspond to a red-green-blue-white ("RGBW") set of light emitting diodes.

6. The computing device of claim 1, wherein the one or more processors control the front light at least in part by switching a power state of the front light in response to the one or more detected device conditions.

7. The computing device as described in claim 1, wherein the one or more processors:
    detect at least one application notification from at least one of a plurality of applications, wherein the at least one application notification includes an email message, a text message, an application update, a network service update, an alarm clock alert, and a timer alert; and
    control the front light based on the detected at least one application notification by altering the state of the front light based on the at least one application notification.

8. The computing device of claim 1, wherein the color of the front light is altered upon detection of a first device condition, the luminosity of the front light is altered upon detection of a second device condition, and the blinking pattern of the front light is altered upon detection of a third device condition, wherein the first device condition, the second device condition, and the third device condition are different from one another.

9. A method for operating a computing device, the method being implemented using one or more processors and comprising:
    detecting a plurality of device conditions that affect an ability of the computing device to render content on a display screen, wherein each of the plurality of device conditions is associated with a respective operational status of each one of a plurality of hardware components including a battery, a wireless radio, a speaker, and a microphone; and
    while content is displayed on the display screen of the computing device, controlling a front light of the computing device, which optically coupled to the display screen, based on the detected device conditions by altering a state of the front light based on the operational status of each one of the hardware components,
    wherein altering the state of the front light includes (i) changing a color of the front light, (ii) changing a luminosity of the front light, and (iii) blinking the front light in a pattern, and
    wherein the state of the front light is altered differently for each of the device conditions.

10. The method of claim 9, wherein detecting the one or more device conditions includes detecting a power level of the battery.

11. The method of claim 10, wherein controlling the front light includes altering the color of the front light based on the power level of the battery.

12. The method of claim 9, wherein controlling the front light includes switching a power state of the front light based on the one or more detected device conditions.

13. A method for operating a computing device, the method being implemented using one or more processors and comprising:
    detecting a plurality of triggers generated by one or more applications that detect events on the computing device, wherein each of the plurality of triggers is associated with a respective operational status of each one of a plurality of hardware components including a battery, a wireless radio, a speaker, and a microphone; and
    while content is displayed on a display screen of the computing device, controlling a front light of the computing device, which optically coupled to the display screen, based on the detected triggers by altering a state of the front light based on the operational status of each one of the hardware components,
    wherein altering the state of the front light includes (i) changing a color of the front light, (ii) changing a luminosity of the front light, and (iii) blinking the front light in a pattern, and
    wherein the state of the front light is altered differently for each of the triggers.

14. The method of claim 13, wherein controlling the front light includes selecting a color for the front light based on the detected one or more triggers.

15. The method of claim 14, wherein selecting the color for the front light is based at least in part on an application source of the detected one or more triggers.

16. The method of claim 13, wherein detecting one or more triggers generated by one or more applications includes detecting a trigger generated by an application that controls a hardware component.

* * * * *

UNITED STATES PATENT AND TRADEMARK OFFICE
CERTIFICATE OF CORRECTION

PATENT NO. : 9,983,650 B2
APPLICATION NO. : 14/231396
DATED : May 29, 2018
INVENTOR(S) : Damian Lewis Page 1 of 1

It is certified that error appears in the above-identified patent and that said Letters Patent is hereby corrected as shown below:

In the Specification

Column 12, Line 16, please change "While some examples provide for the front light to after" to --While some examples provide for the front light to alter--; and Column 12, Line 23, please change "examples of described herein as to triggers can after the state" to --examples of described herein as to triggers can alter the state--.

Signed and Sealed this
Twenty-sixth Day of November, 2019

Andrei Iancu
*Director of the United States Patent and Trademark Office*